United States Patent
Hasuo

(10) Patent No.: US 10,424,995 B2
(45) Date of Patent: Sep. 24, 2019

(54) METHOD FOR MANUFACTURING LAMINATED CORE, LAMINATED CORE, AND WELDING MACHINE

(71) Applicant: Mitsui High-tec, Inc., Yahatanishi-ku, Kitakyushu-shi (JP)

(72) Inventor: Yusuke Hasuo, Kitakyushu (JP)

(73) Assignee: MITSUI HIGH-TECH, INC., Fukuoka (JP)

(*) Notice: Subject to any disclaimer, the term of this patent is extended or adjusted under 35 U.S.C. 154(b) by 220 days.

(21) Appl. No.: 15/235,473

(22) Filed: Aug. 12, 2016

(65) Prior Publication Data
US 2017/0047829 A1    Feb. 16, 2017

(30) Foreign Application Priority Data
Aug. 12, 2015 (JP) ................. 2015-159381

(51) Int. Cl.
| | |
|---|---|
| H02K 1/06 | (2006.01) |
| H02K 15/02 | (2006.01) |
| B23K 9/00 | (2006.01) |
| B23K 35/38 | (2006.01) |
| B23K 35/40 | (2006.01) |
| B23K 35/02 | (2006.01) |
| B23K 9/18 | (2006.01) |
| B23K 26/348 | (2014.01) |
| B23K 101/36 | (2006.01) |

(52) U.S. Cl.
CPC ......... *H02K 15/022* (2013.01); *B23K 9/0026* (2013.01); *B23K 9/182* (2013.01); *B23K 26/348* (2015.10); *B23K 35/0255* (2013.01); *B23K 35/0261* (2013.01); *B23K 35/38* (2013.01); *B23K 35/383* (2013.01); *B23K 35/40* (2013.01); *H02K 1/06* (2013.01); *B23K 2101/36* (2018.08)

(58) Field of Classification Search
CPC ............................ H02K 15/022; B23K 9/0026
USPC ..................................... 310/216.004
See application file for complete search history.

(56) References Cited

U.S. PATENT DOCUMENTS

| | | | | |
|---|---|---|---|---|
| 2,845,555 A | * | 7/1958 | Carpenter | B23K 11/002 219/162 |
| 5,472,772 A | * | 12/1995 | Jones | B23K 26/20 219/136 |
| 5,750,955 A | * | 5/1998 | Yoshino | B23K 10/02 219/121.46 |
| 6,477,761 B1 | * | 11/2002 | Ohashi | H02K 1/16 228/190 |
| 2011/0248596 A1 | * | 10/2011 | Utaka | H02K 1/17 310/216.004 |

(Continued)

FOREIGN PATENT DOCUMENTS

| | | |
|---|---|---|
| JP | S61-000437 | 1/1986 |
| JP | 2011036077 A | 2/2011 |

*Primary Examiner* — Terrance L Kenerly
(74) *Attorney, Agent, or Firm* — Procopio, Cory, Hargreaves & Savitch LLP

(57) ABSTRACT

A method for manufacturing a laminated core includes a laminating process of obtaining a laminate in which a plurality of core pieces are laminated, and a welding process of forming a weld bead which extends in a thickness direction of the laminate on a side surface of the laminate. In the welding process, a heat input when a center portion in a longitudinal direction of the weld bead is formed is greater than a heat input when an end portion of the weld bead is formed.

20 Claims, 14 Drawing Sheets

(56) References Cited

U.S. PATENT DOCUMENTS

2012/0058313 A1* 3/2012 Nagai .................. H02K 1/16
428/195.1

* cited by examiner

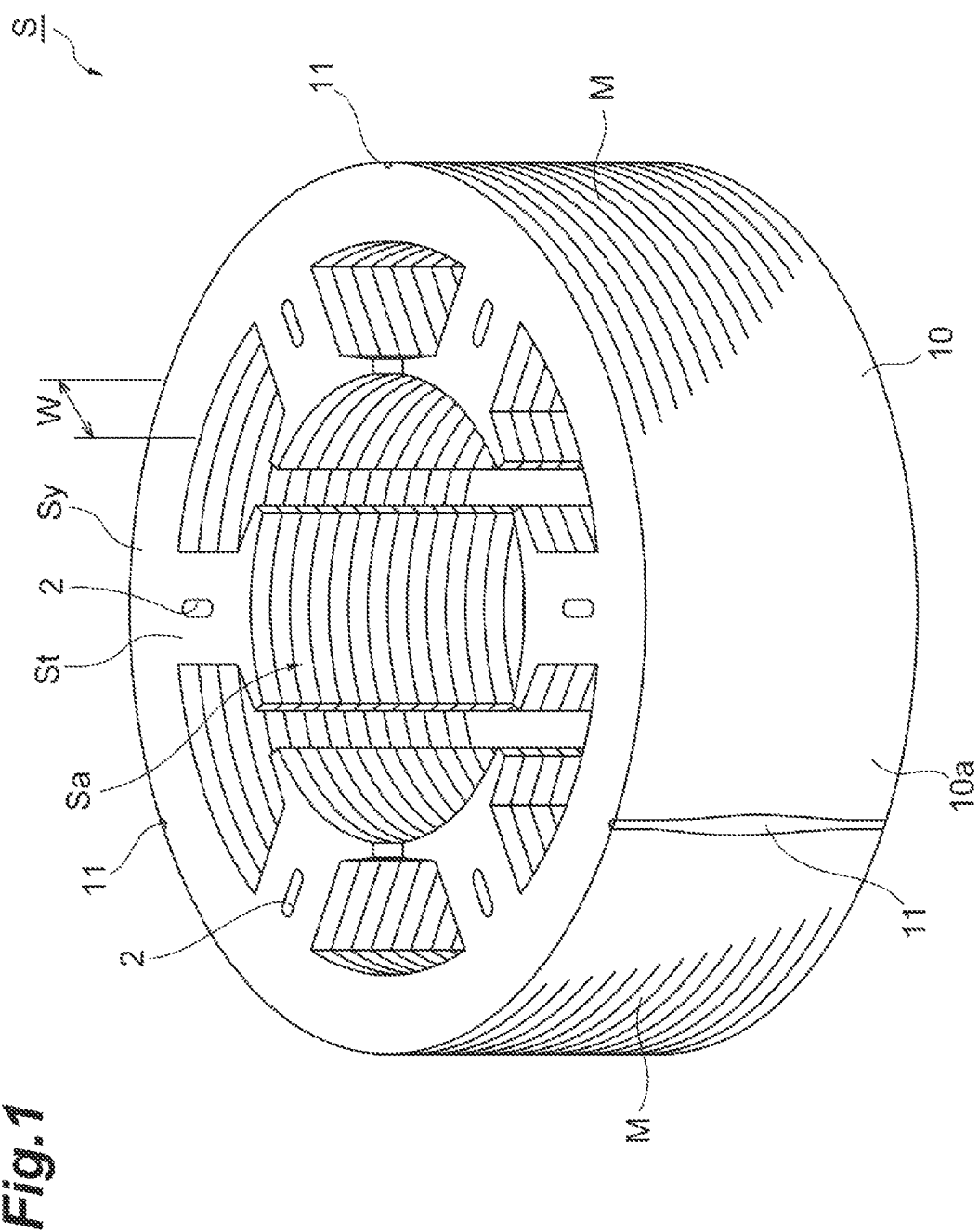

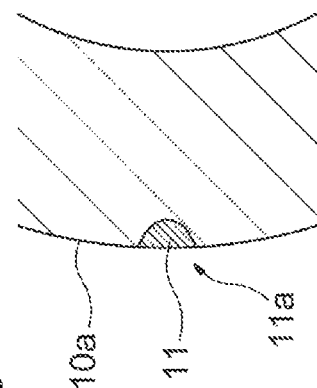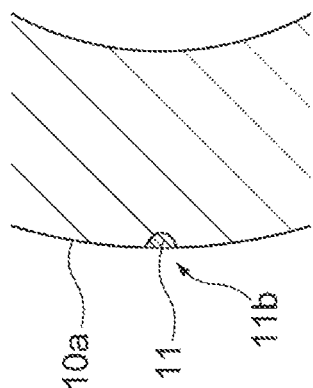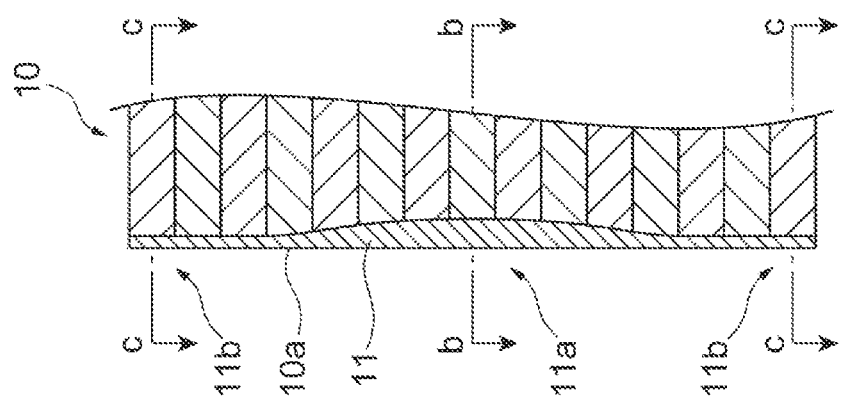

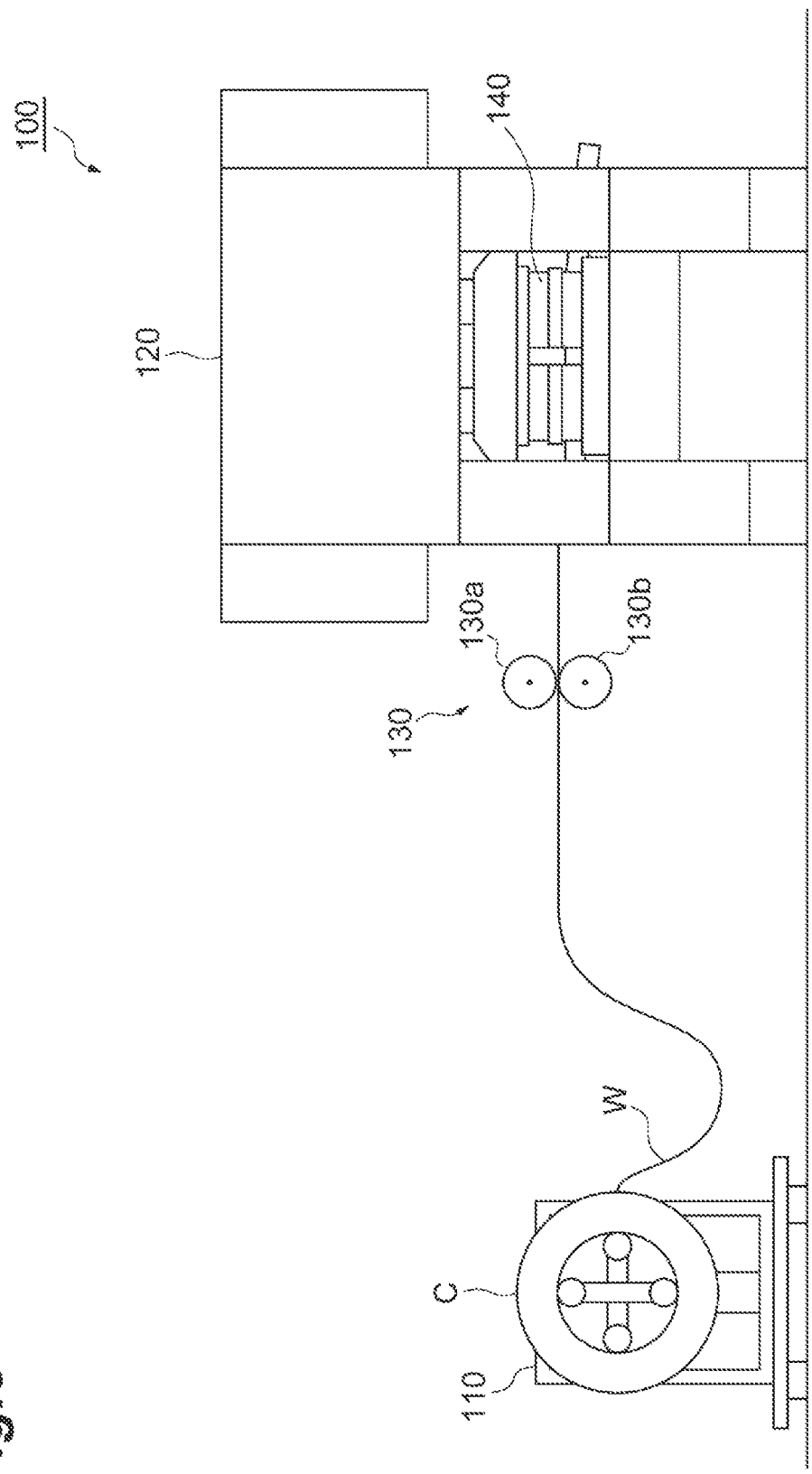

METHOD FOR MANUFACTURING LAMINATED CORE, LAMINATED CORE, AND WELDING MACHINE

CROSS-REFERENCE TO RELATED APPLICATIONS

This application is based upon and claims the benefit of priority from Japanese Patent Application No. 2015-159381, filed Aug. 12, 2015, the entire contents of which are incorporated herein by reference.

BACKGROUND

1. Field

The present disclosure relates to a method for manufacturing a laminated core, a laminated core, and a welding machine for manufacturing a laminated core.

2. Disclosure of the Related Art

A laminated core is a component of a motor, and is formed by stacking a plurality of core pieces which are processed into predetermined shapes, and joining the core pieces together. A motor includes a rotor and a stator. Each of the rotor and stator includes a laminated core. A method for manufacturing the motor includes winding coils around the stator, mounting a shaft on the rotor, and the like. In the related art, motors having a laminated core are used as a drive source for refrigerators, air conditioners, hard disk drives, electric tools, or the like, and in recent years, these motors have also been used as drive sources for hybrid cars.

Welding is a known process for manufacturing a laminated core, as means for joining electromagnetic steel sheets adjacent vertically (refer to Japanese Unexamined Utility Model Publication No. S61-437). In the related art, joining the electromagnetic steel sheets by welding or by welding and swaged area together is widely adopted, because such joining is favorable from the viewpoint of costs and operation efficiency.

SUMMARY

A method for manufacturing a laminated core according to one aspect of the present disclosure including laminating a plurality of core pieces to obtain a laminate, and forming a weld bead on a side surface of the laminate, the weld bead extending in a height direction of the laminate. In forming the weld bead, heat applied when a center portion in a longitudinal direction of the weld bead is formed is greater than heat applied when an end portion of the weld bead is formed.

BRIEF DESCRIPTION OF THE DRAWINGS

FIG. 1 is a perspective view showing an example of a stator including a laminated core.

FIG. 2A is a vertical sectional view schematically showing a depth of a weld bead of the laminated core shown in FIG. 1.

FIG. 2B is a cross-sectional view taken along line b-b of FIG. 2A.

FIG. 2C is a cross-sectional view taken along line c-c of FIG. 2A.

FIG. 3 is a schematic view showing one example of a laminate manufacturing apparatus including a progressive die.

DETAILED DESCRIPTION

[1] Outline of Embodiment

Figure 4:
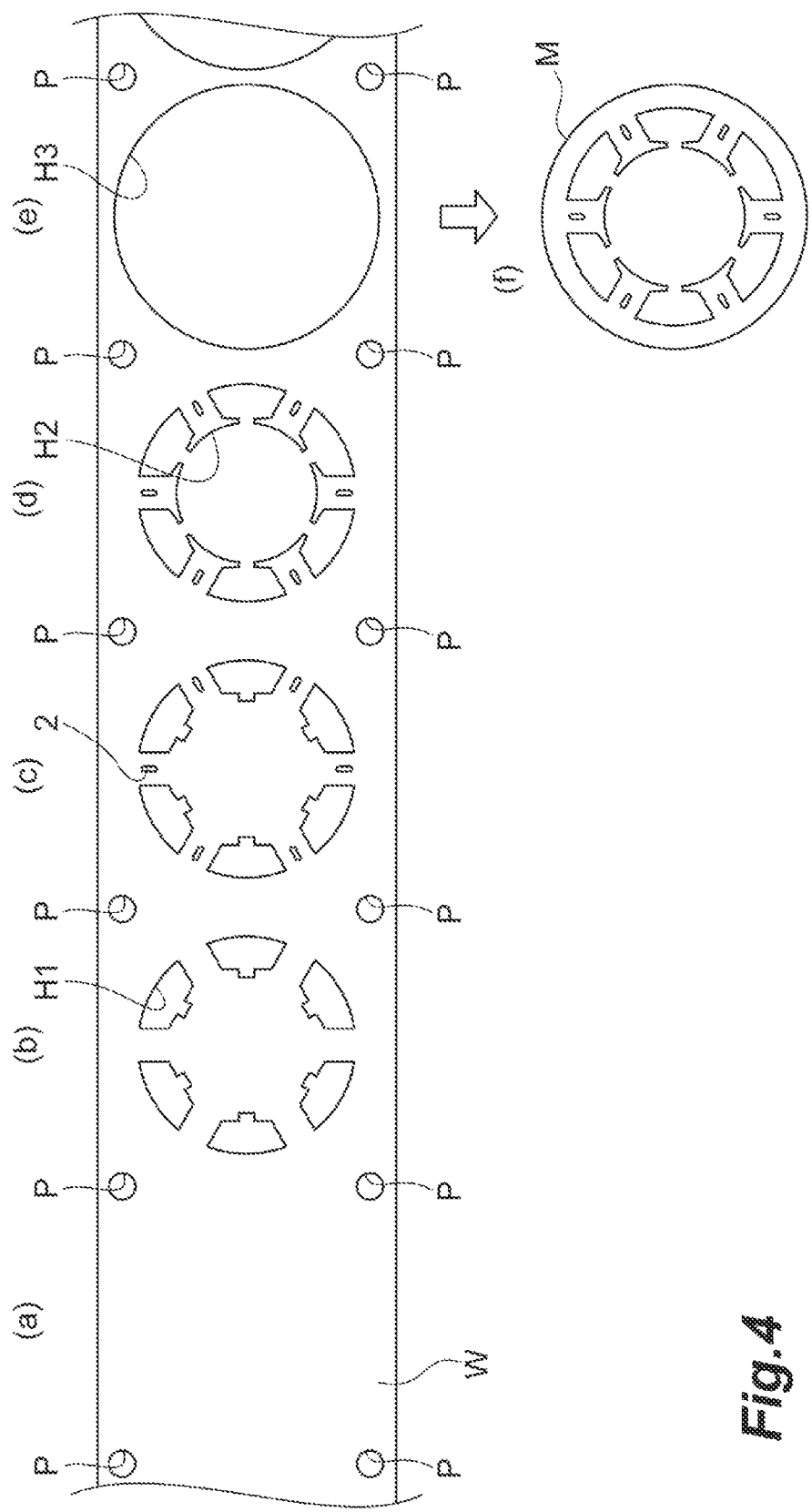
FIG. 4 is a view showing an example of a stamping layout for manufacturing a core piece.

A method for manufacturing a laminated core according to one aspect of the present embodiment includes laminating a plurality of core pieces to obtain a laminate, and forming a weld bead on a side surface of the laminate, the weld bead extending in a height direction of the laminate. In forming the weld bead, heat applied when a center portion in a longitudinal direction of the weld bead is formed is greater than heat applied when an end portion of the weld bead is formed.

According to the manufacturing method, by allowing heat applied to the center portion of the weld bead to be greater than heat applied to the end portion, it is possible to sufficiently suppress occurrence of cracks in the weld bead. In a case where heat applied to the center portion increases by welding once, occurrence of the cracks is prevented by improving yield strength with respect to stress at the center portion. In addition, in a case where heat applied increases over a plurality of times, in addition to improvement of the yield strength, occurrence of the cracks is prevented by mitigating the stress generated by previous welding. Accordingly, for example, a follow-up observation may not be performed after welding is performed, and makes the manufacturing process of the laminated core to be effective. In addition, by limiting locations requiring great heat applied to the center portion, it is possible to sufficiently prevent performance of the laminated core from decreasing due to heat during welding.

In a case where a welding machine capable of adjusting heat applied by a current value such as a welding machine (for example, TIG welding machine) using arc discharging is used in the welding process, preferably, a welding current value when the center portion in the longitudinal direction of the weld bead is formed is higher than a welding current value when the end portion of the weld bead is formed. In addition, for example, in a case where a laser welding machine is used in the welding process, preferably, a laser output when the center portion in the longitudinal direction of the weld bead is formed is higher than a laser output when the end portion of the weld bead is formed.

In the welding process, a welding speed when the center portion in the longitudinal direction of the weld bead is formed may be slower than a welding speed when the end portion of the weld bead is formed such that heat applied when the center portion in the longitudinal direction of the weld bead is formed is greater than heat applied when the end portion of the weld bead is formed. Alternatively, the welding process may include welding a center portion in a longitudinal direction from a location, at which the weld bead is formed, a plurality of times. When doing so, the center portion may be welded again after performing welding at all the locations where the weld beads are formed, or all the location may be welded after performing welding only at the center portion. In addition, the plurality of weld beads may overlap on the center portion of the location at which the weld bead is formed.

A laminated core according to another aspect of the present embodiment includes a laminate in which a plurality of core pieces are laminated, and a weld bead which extends in a thickness direction of the laminate on a side surface of the laminate. In a cross-sectional area of the weld bead in a direction orthogonal to the thickness direction, a cross-sectional area of a center portion in a longitudinal direction of the weld bead is greater than a cross-sectional area of an end portion of the weld bead. As described above, in the laminated core, occurrence of cracks in the weld bead is sufficiently suppressed, and the laminated core is effectively manufactured. In addition, since the locations where great heat is applied are limited to the center portion, a decrease in performance due to heat during welding is prevented, and it is possible to sufficiently suppress a decrease in performance due to an increase in a cross-sectional area of the weld bead and increased occurrence of electric short-circuits in the thickness direction of the laminated core.

A welding machine according to still another aspect of the present embodiment is a manufacturing machine for manufacturing the laminated core. The welding machine includes a welding torch, moving means for moving the welding torch in the thickness direction of the laminate along the side surface of the laminate, and a controller for controlling heat applied from the welding torch to the side surface. The controller controls heat applied from the welding torch to the laminate such that heat applied when the center portion in the longitudinal direction of the weld bead is formed is greater than heat applied when the end portion of the weld bead is formed. According to this welding machine, it is possible to effectively manufacture the laminated core in which occurrence of cracks in the weld bead is sufficiently suppressed.

[2] Embodiment

An embodiment according to the present disclosure will be described in detail with reference to the drawings. In descriptions below, the same reference numerals are assigned to the same elements or elements having the same function, and overlapping descriptions thereof are omitted.

FIG. 1 is a perspective view of a laminated core S configuring a stator. The shape of the laminated core S is approximately cylindrical, and a rotor (not shown) is disposed in an opening Sa which is positioned at the center portion of the laminated core S. The laminated core S includes an approximately annular yoke portion Sy, and tooth portions St which extends in a center direction from the inner circumferential side of the yoke portion Sy. According to a use and performance of a motor, a width (W in FIG. 1) of the yoke portion Sy is approximately 2 mm to 40 mm. The laminated core S shown in FIG. 1 has six tooth portions St. In addition, the number of the tooth portions St is not limited to six.

As shown in FIG. 1, the laminated core S includes a laminate 10 in which a plurality of core pieces M processed in a predetermined shape are laminated, swaged areas 2 which are formed in the tooth portions St, and a plurality of weld beads 11 which extend in a thickness direction of the laminate 10 on the side surface 10a of the laminate 10. In the present embodiment, a total of three weld beads 11 are formed from the upper surface of the laminate 10 to the lower surface thereof (in the entire thickness direction of the laminate 10). In addition, here, a case where joining by the swaged areas 2 and joining by welding (weld beads 11) are used is exemplified. However, joining by only the welding may be used. The number of the weld beads 11 is not limited to three, and may be set so as to obtain sufficient strength according to the shape or size of the laminated core.

FIG. 2A is a vertical sectional view schematically showing the depth of the weld bead 11 of the laminated core S. Compared to end portions 11b and 11b, in a center portion 11a in the longitudinal direction (thickness direction of the laminate 10) of the weld bead 11, the weld bead 11 is formed to a deep position from a side surface 10a of the laminate 10. FIG. 2B is a cross-sectional view taken along line b-b of FIG. 2A. FIG. 2C is a cross-sectional view taken along line c-c of FIG. 2A. That is, in a cross-sectional area (penetration area) of the weld bead 11 in a direction orthogonal to the thickness direction of the laminate 10, the cross-sectional area of the center portion 11a in the longitudinal direction of the weld bead 11 is greater than cross-sectional area of each of the end portions 11b and 11b of the weld bead 11. As described below, this is because heat applied when the center portion 11a in the longitudinal direction of the weld bead 11 is formed is greater than heat applied when the end portions 11b and 11b of the weld bead 11 are formed in the welding process.

FIG. 3 is a schematic view showing one example of an apparatus for manufacturing the laminate 10. A laminate manufacturing apparatus 100 shown in FIG. 3 includes a uncoiler 110 on which a coil C is mounted, a feeding device 130 of a strip-shaped core material (hereinafter, referred to as a "workpiece plate W") which is drawn from the coil C, a progressive die 140 which performs stamping on the workpiece plate W, and a press machine 120 which operates the progressive die 140.

The coil C is rotatably supported by the uncoiler 110. For example, a length of an electromagnetic steel sheet configuring the coil C is 500 m to 10,000 in. A thickness of the electromagnetic steel sheet configuring the coil C may be approximately 0.1 mm to 0.5 mm, and from the viewpoint of achieving more favorable magnetic characteristics of the laminated core S the thickness of the electromagnetic steel sheet may be approximately 0.1 mm to 0.3 mm. A width of the electromagnetic steel sheet (workpiece plate W) may be approximately 50 mm to 500 mm.

The feeding device 130 includes a pair of rollers 130a and 130b disposed vertically, and the workpiece plate W is interposed therebetween. The workpiece plate W is introduced into the progressive die 140 via the feeding device 130. The progressive die 140 continuously performs stamping, half blanking, push back processing if necessary; or the like on the workpiece plate W.

FIG. 4 is a schematic view showing a stamping layout for manufacturing a core piece M configuring the laminate 10. A process of forming pilot holes P on the workpiece plate W is performed at a position (a) of FIG. 4. A process of forming a total of six openings H1 configuring the inner circumferential surface of the yoke portion Sy and the side surfaces of the tooth portions St is performed at a position (b) of FIG. 4. A process of forming swaged areas 2 on portions in which the tooth portions St are formed at a position (c) of FIG. 4. In addition, when the core piece M configuring the undermost layer in the laminate 10 is manufactured punched holes (not shown) are formed instead of the swaged areas 2. A process of forming an opening H2 becoming the opening Sa is performed at a position (d) of FIG. 4. A process of forming an opening H3 configuring the outer circumferential surface of the yoke portion Sy is performed at a position (e) of FIG. 4. By forming the opening H3, the core piece M having the shape shown at a position (f) of FIG. 4 is obtained. By laminating a plurality of core pieces M, the laminate 10 is obtained (lamination process).

Figure 5:
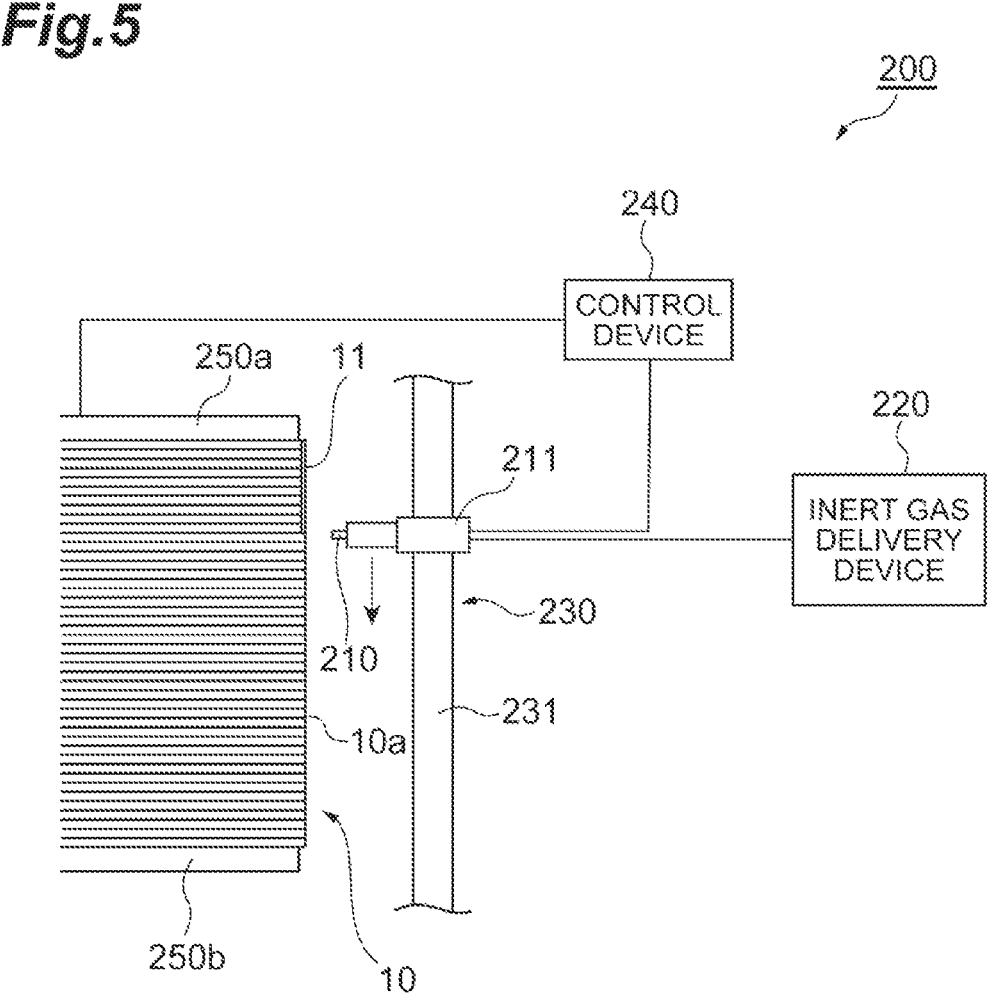
FIG. 5 is a schematic view showing one example of a welding machine.

FIG. 5 is a schematic view showing an example of a welding machine, and shows a process of performing welding from the upper end of the laminate 10. A Tungsten Inert Gas (TIG) welding machine 200 shown in FIG. 5 includes an electrode rod 210 (welding torch), an inert gas delivery device 220, moving means 230 for moving the electrode rod 210 along the side surface 10a of the laminate 10, and a control device 240 (controller) for controlling heat input applied from the electrode rod 210 to the side surface 10a of the laminate 10. In a state where the laminate 10 is interposed between welding tools 250a and 250b and a compressive force is applied to the laminate 10 in the thickness direction, the weld beads 11 are formed on the side surface 10a of the laminate 10 (welding process). Accordingly, the core pieces M adjacent vertically are joined by swaged areas 2 and the welding, and thus, the laminated core S is manufactured.

In the TIG welding, tungsten is used as a material of the electrode rod 210. In addition, in order to block a weld location from the atmosphere and to protect the weld location, welding is performed while blowing inert gas (argon, helium, or the like) to the weld location from inert gas delivery device 220. The moving means 230 includes a guide 231 which extends in the thickness direction of the laminate 10 along the side surface 10a of the laminate 10, and a drive mechanism (not shown) which slides an electrode rod support body 211 which is provided to be slidable with respect to the guide 231. As a specific example of the drive mechanism, there is a servo motor or the like.

Figure 6:
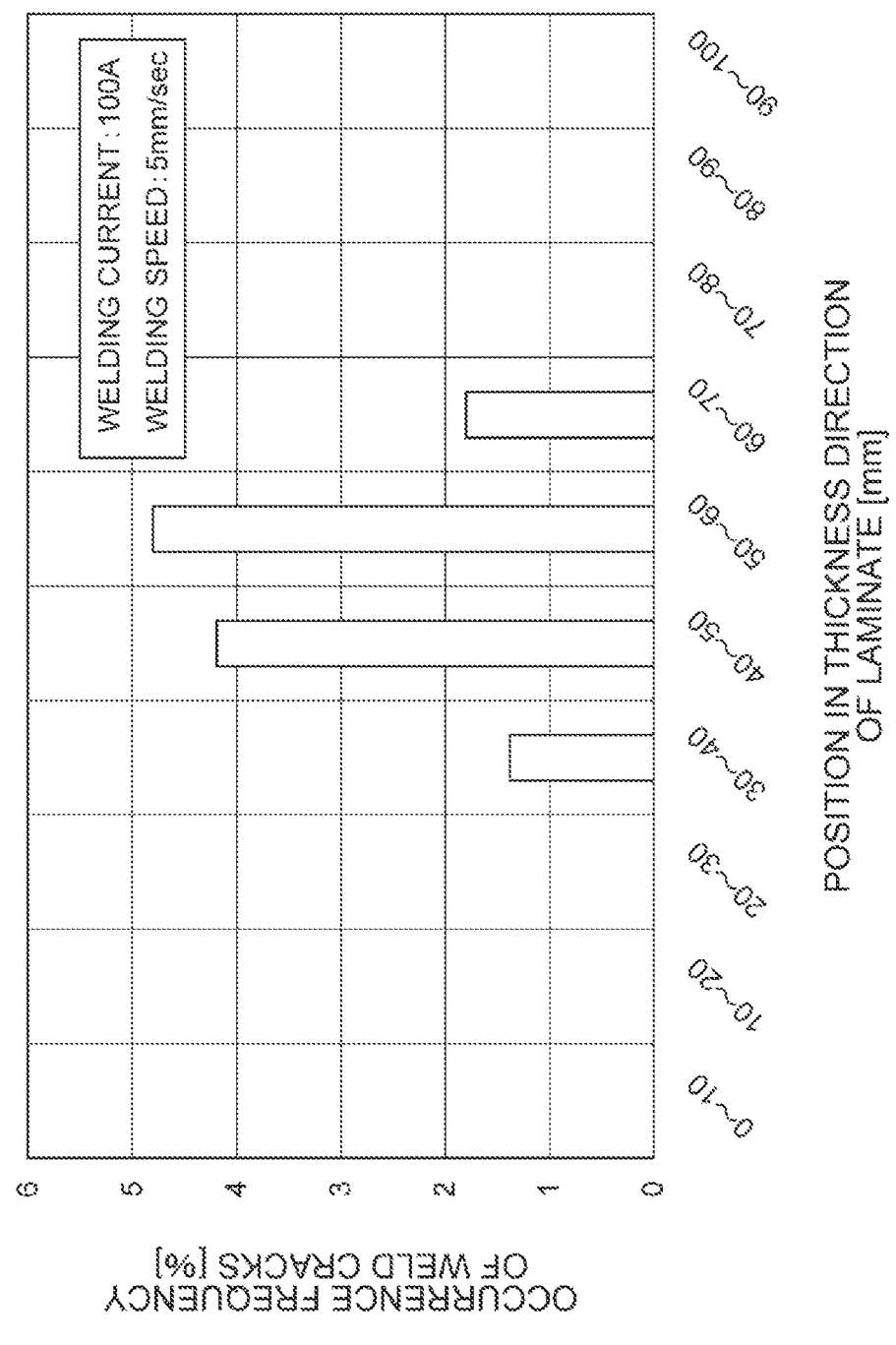
FIG. 6 is a graph showing frequency with which cracks occur in a weld bead formed on a laminate in the entire height direction under certain conditions.

The control device 240 controls heat applied from the electrode rod 210 to the side surface 10a of the laminate 10. A computer can be used as the control device 240. In the related art, in a series of welding operations, a welding current value and a welding speed are constant. In this case, as shown in FIG. 6, weld cracks occurred at the center portion of the weld bead. Meanwhile, as shown in Examples 1 to 4 of FIG. 7, in a series of welding operations, by changing the welding current value midway, heat applied when the center portion 11a of the weld bead 11 is formed is greater than heat applied when the end portions 11b and 11b of the weld bead 11 are formed. According to the control of the welding current value, it is possible to sufficiently suppress occurrence of the weld cracks. As a result, occurrence of the weld cracks becomes 0%.

Figure 7:
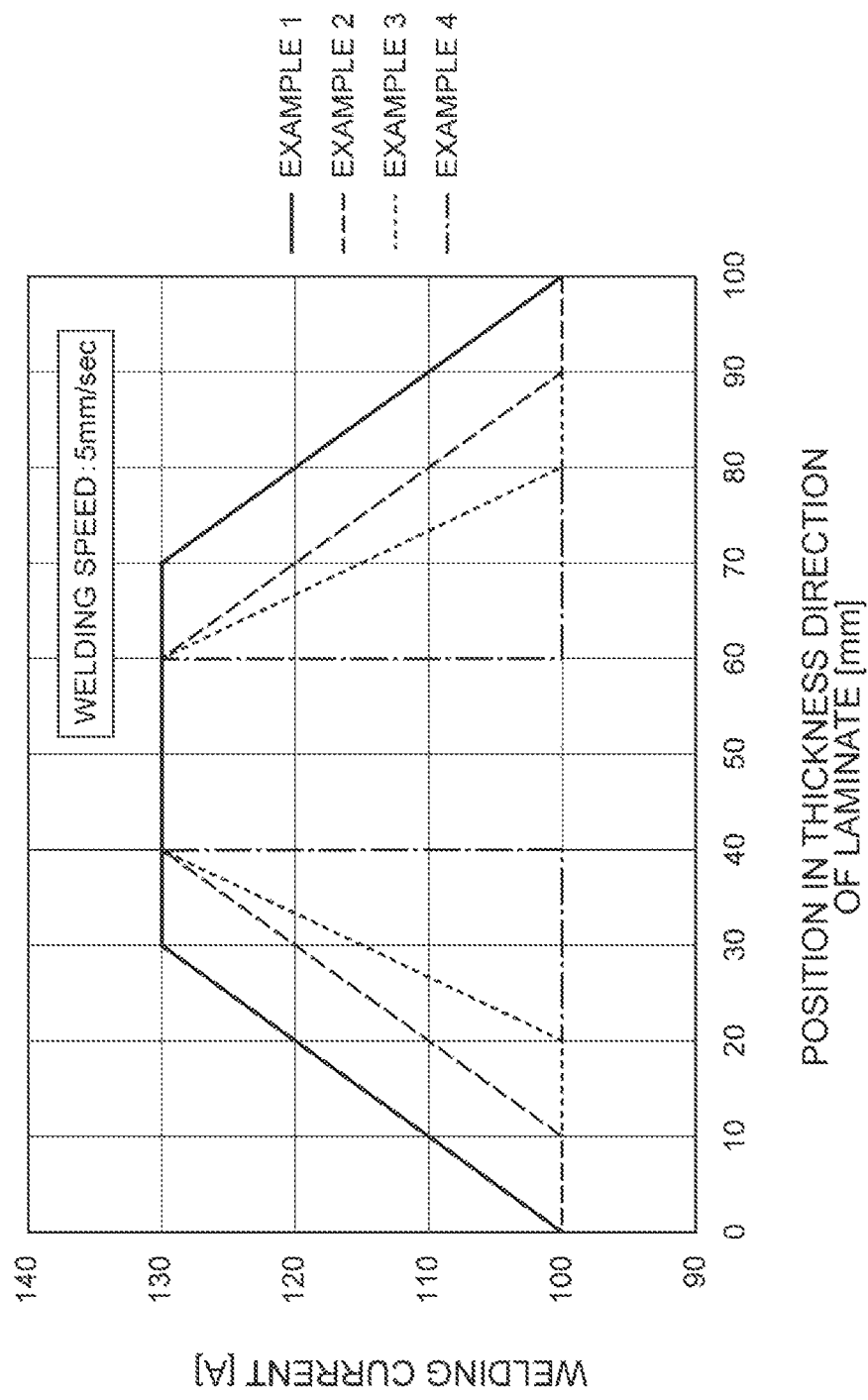
FIG. 7 is a graph showing profiles of welding currents in Examples 1 to 4.

Profiles of the welding current values are not limited to those shown in FIG. 7. The welding current value when welding starts, the maximum value of the welding current values, a period which maintains the maximum value of the welding current values, an inclination when the welding current increases, an inclination when the welding current decreases, or the like may be appropriately determined according to specifications of the laminated core. The profiles of the welding current values are not limited to folded line shapes shown in FIG. 7, and may be curves.

Figure 8:
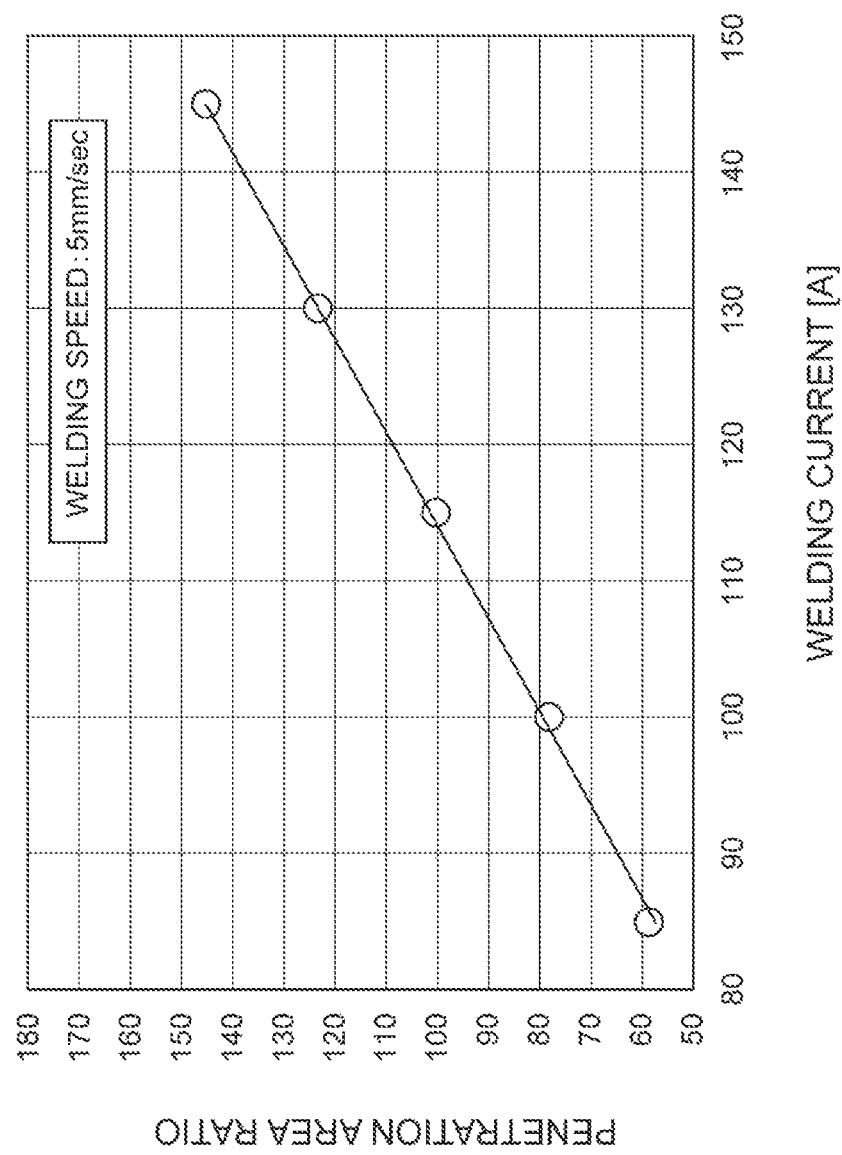
FIG. 8 is a graph showing a relationship between the welding current and a penetration area (relative value).

FIG. 8 is a graph showing a relationship between the welding currents and penetration areas (relative values). A "penetration area ratio" of the vertical axis in FIG. 8 is based on the penetration area (cross-sectional area of weld bead) when welding is performed under a condition in which the welding current is 115 A and the welding speed is 5 mm/second. As shown in this graph, the penetration area increases by increasing the welding current value.

Figure 9:
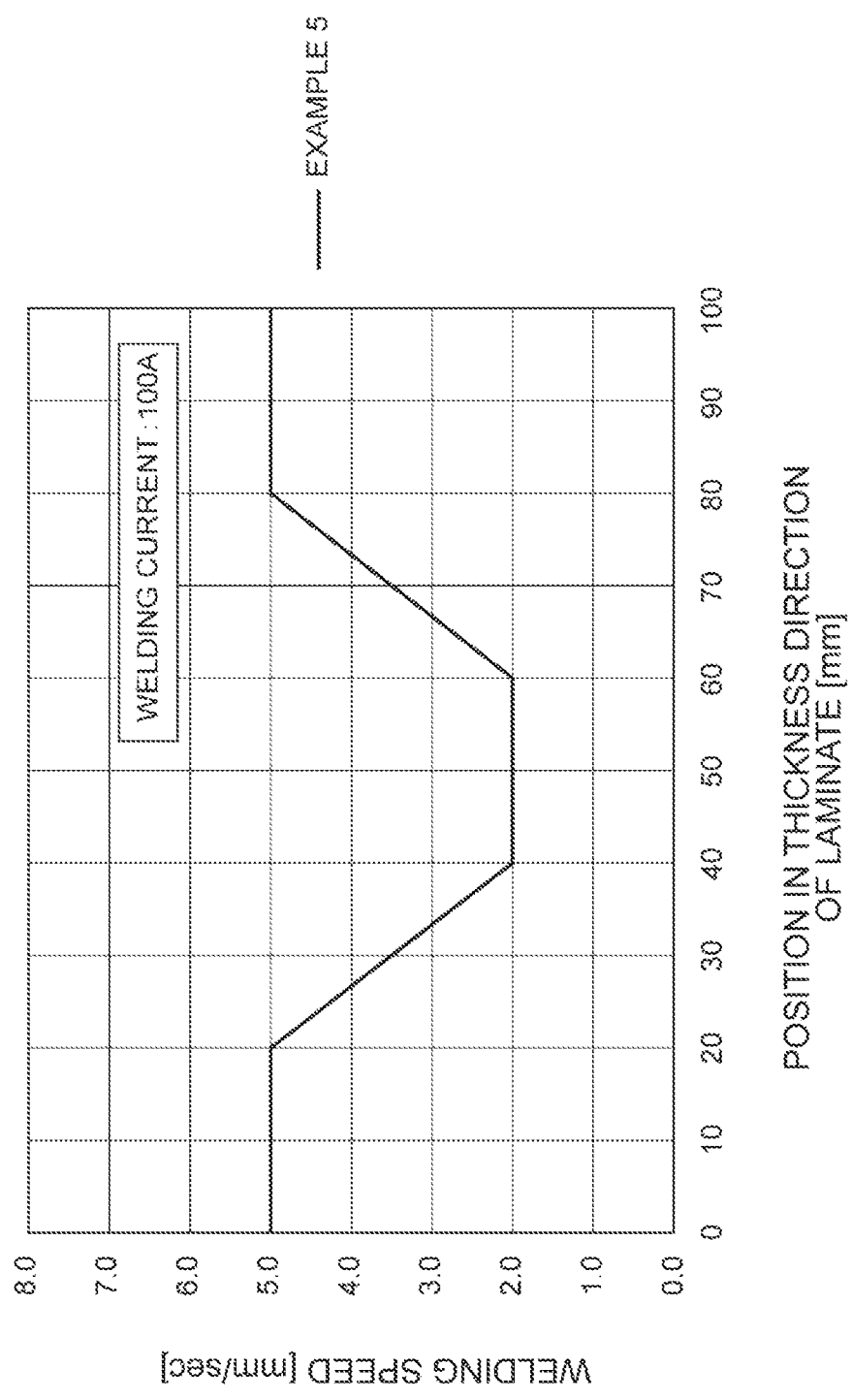
FIG. 9 is a graph showing a profile of a welding speed (moving speed of welding torch) in Example 5.

In Example 5 of FIG. 9, in a series of welding operations, by changing the welding speed (moving speed of the electrode rod 210) midway, heat applied when the center portion 11a of the weld bead 11 is formed is greater than heat applied when the end portions 11b and 11b of the weld bead 11 are formed. According to the control of the welding speed, it is possible to sufficiently suppress occurrence of weld cracks. As a result, the occurrence of weld cracks becomes 0%.

The profiles of the welding speeds are not limited to those shown in FIG. 9. The welding speed when welding starts, the minimum value of the welding speeds, a period which maintains the minimum value of the welding speeds, an inclination when the welding speed increases, an inclination when the welding speed decreases, or the like may be appropriately determined according to specifications of the laminated core. The profiles of the welding speeds are not limited to folded line shapes shown in FIG. 9, and may be curves.

Figure 10:
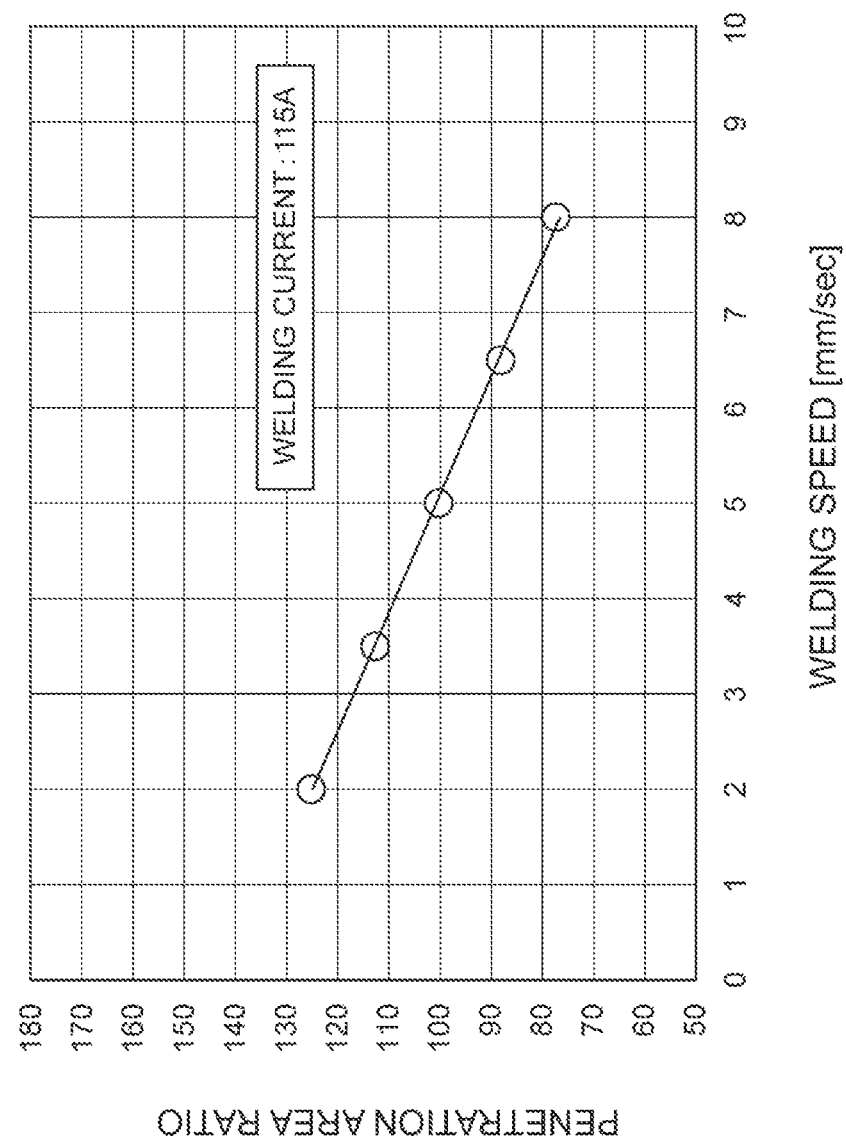
FIG. 10 is a graph showing a relationship between the welding speed and the penetration area (relative value).

FIG. 10 is a graph showing a relationship between the welding speed and the penetration area (relative values). The "penetration area ratio" of the vertical axis in FIG. 10 is based on the penetration area (cross-sectional area of weld bead) when welding is performed under a condition in which the welding current is 115 A and the welding speed is 5 mm/second. As shown in this graph, the penetration area increases by decreasing the welding speed.

Figure 11A:
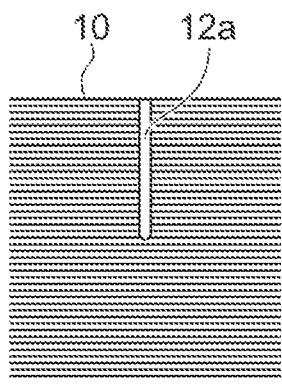
FIG. 11A is a schematic view showing another example of the welding process.
Figure 11B:
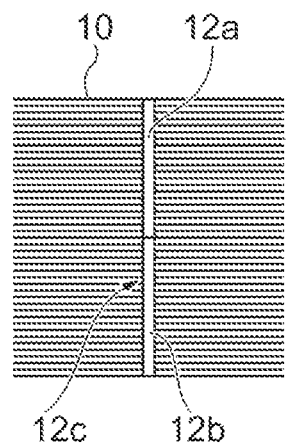
FIG. 11B is a schematic view showing still another example of the welding process.
Figure 11C:
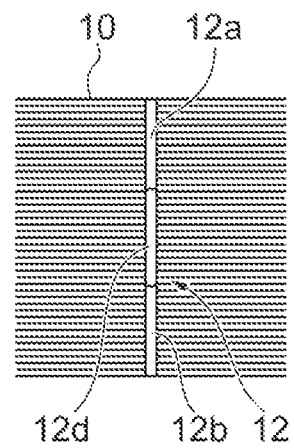
FIG. 11C is a schematic view showing still another example of the welding process.

In the above descriptions, the case where at least one of the welding current value and the welding speed is changed in a series of welding operations is exemplified. However, the weld beads 11 may be formed by a plurality of times of welding which is continuously performed in a series of welding operations. By performing welding at the center portion again after performing welding at all the locations where the weld beads are formed, or by performing welding at all the location after performing welding only at the center portion, it is possible to increase heat applied to the center portion. In addition, FIGS. 11A to 11C are schematic views showing a case one weld bead 12 is formed by three-time welding in a series of welding operations. FIG. 11A shows a process in which a weld bead 12a is formed from one end portion of the laminate 10 to the center portion. FIG. 11B shows a process in which one connected weld bead 12c is formed by forming a weld bead 12b from the other end portion of the laminate 10 to the center portion. FIG. 11C shows a process in which a weld bead 12 is formed by forming a weld bead 12d at the center portion of the one connected weld bead 12c of the laminate 10. Each of the weld beads 12a and 12b may be formed from the center portion of the laminate 10 toward the end portion. By performing the processes shown in FIGS. 11A to 11C, it is possible to cause heat applied when the center portion in the longitudinal direction of the weld bead 12 is formed to be greater than heat applied when the end portion of the weld bead is formed.

Figure 12A:
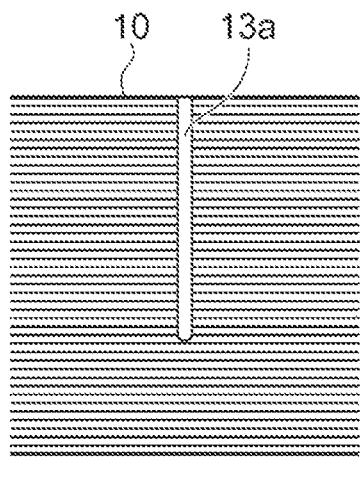
FIG. 12A is a schematic view showing still another example of the welding process.
Figure 12B:
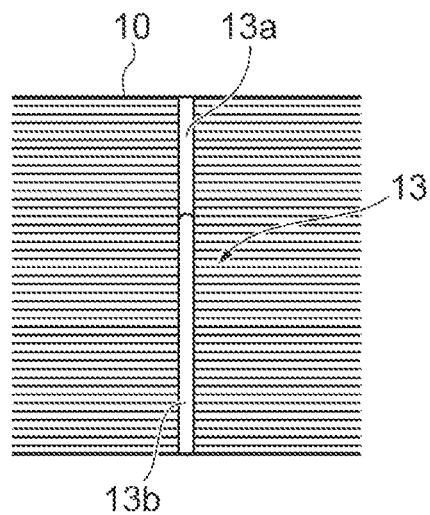
FIG. 12B is a schematic view showing still another example of the welding process.

FIGS. 12A and 12B are schematic views showing a case where one weld bead 13 is formed by two-time welding in a series of welding operations. FIG. 12A shows a process in which a weld bead 13a is formed from one end portion of the laminate 10 to a position which passes the center portion and does not reach the other end portion. FIG. 12B shows a process in which a weld bead 13 is formed by a weld bead 13b from the other end portion of the laminate 10 to a position which passes the center portion and does not reach the one end portion. The center portion of the weld bead 13 is formed by two-time welding (weld beads 13a and 13b).

By performing the processes shown in FIGS. 12A and 12B, it is possible to cause heat applied when the center portion in the longitudinal direction of the weld bead 13 is formed to be greater than heat applied when the end portion of the weld bead is formed. The weld beads 13a and 13b may be formed from a position close to the one end portion of the laminate 10 toward the other end portion. The weld beads 13a and 13b may be simultaneously formed using two welding torches. At this time, the movements of the two welding torches are set such that welding is not simultaneously performed at the same position.

As shown in FIG. 2 of Japanese Unexamined Utility Model Publication No. S61-437, in a case where a weld bead (welding portion) is formed in an entire thickness direction of a laminate, the welding is performed under the same condition from start to finish in consideration of safety. However, the inventors' studies have revealed that, in a case where a weld bead having a certain length (for example, 50 mm or more) is formed in the thickness direction of the laminate, there is a problem of increased frequency with which cracks occur in the middle of the weld bead (refer to FIG. 6). Since the maximum stress is at the center portion of the weld bead in the thickness direction of the laminate, cracks are considered to occur in the weld bead. If cracks occur in the weld bead, properties such as products size or mechanical strength are not satisfied and yield decreases. Occurrence of cracks in the weld bead may be recognized immediately after welding, or may be recognized after a predetermined time elapses. Accordingly, for example, after welding is performed, follow-up observation is performed for 48 hours so as to determine properties of products. The need to perform follow-up observation is one of the factors behind this decrease in efficiency of the manufacturing process.

According to the embodiment, by allowing heat applied to the center portions of the weld beads 11, 12, and 13 to be greater than heat applied to the end portions, it is possible to sufficiently suppress occurrence of cracks in the weld beads 11, 12, and 13. Accordingly, for example, the follow-up observation after welding may not be performed, and it is possible to cause the manufacturing process of the laminated core S to be effective. Accordingly, it is possible to achieve high yield and efficiency of the manufacturing process. In addition, by limiting the location requiring great heat applied to the center portion, it is possible to prevent a decrease in performance of the laminated core S due to heat during welding.

Figure 13:
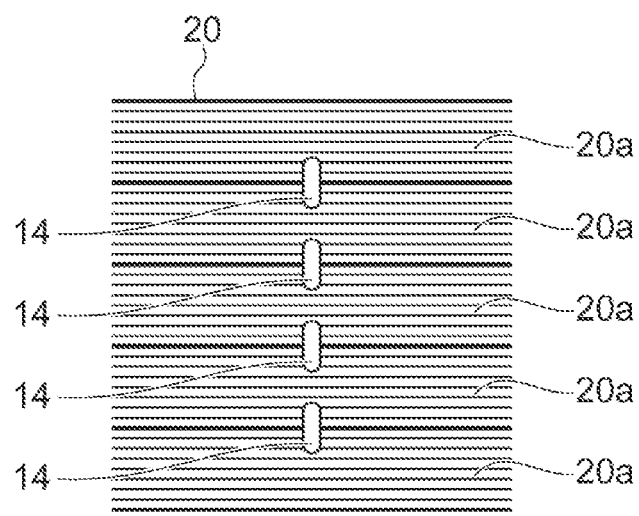
FIG. 13 is a schematic view showing another example of the weld bead.

Hereinbefore, the embodiment of the present invention is described in detail. However, the present invention is not limited to the embodiment. For example, in the embodiment, the case is exemplified in which one connected weld bead is formed in the entire thickness direction of the laminate 10 joined by the swaged areas 2. However, as shown in FIG. 13, a plurality of weld beads 14 (for example, approximately 5 mm to 20 mm length) may be intermittently formed. In this case, by increasing heat applied to the center portion in each weld bead 14, it is possible to prevent cracks of the weld bead 14.

A laminate 20 shown in FIG. 13 is configured of a plurality of blocks 20a, 20a . . . . The plurality of core pieces configuring the block 20a are joined to each other by the swaged area. Accordingly, even when one connected weld bead 14 is not formed over the entire laminate 20, the core pieces are not separated from each other. Meanwhile, the blocks 20a are joined by the weld beads 14. In the laminate 20 configured of the plurality of blocks 20a, 20a . . . , since the blocks 20a are rotationally stacked on each other, there is an advantage that it is possible to decrease influences due to deviation in plate thicknesses of the workpiece plates W.

Figure 14:
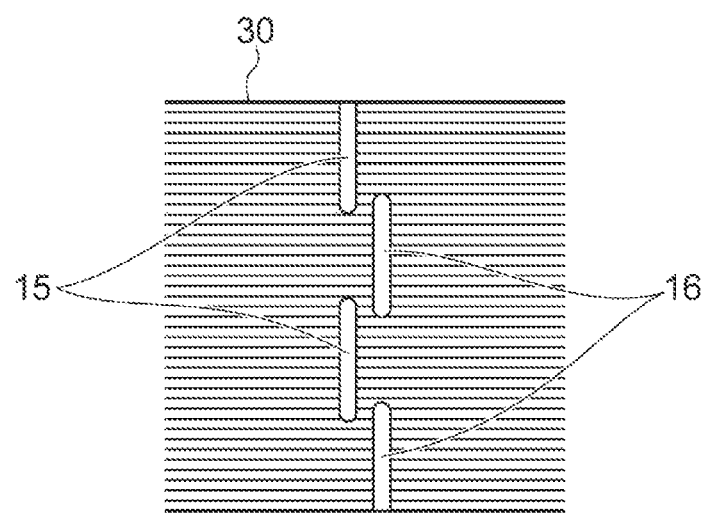
FIG. 14 is a schematic view showing still another example of the weld bead.

As shown in FIG. 14, by intermittently forming a plurality of weld beads 15 and 16 extending in parallel in multiple rows and overlapping the end portions, it is possible to form the entire laminate 30.

In the embodiment, the case in which the core piece is stamped from one workpiece plate W is exemplified. However, the core pieces may be stamped in a state where the plurality of workpiece plates W are superimposed on each other. In this case, when the plurality of workpiece plates W are used, workpiece plates W having kinds, thicknesses and/or widths different each other may be combined and used. In addition, a core piece for a rotor and a core piece for a stator may be stamped from one workpiece plate W.

In the embodiment, the case in which the welding process is performed by the TIG welding is exemplified. However, the welding process may be performed by arc welding or laser welding in addition to the TIG welding.

Indeed, the novel devices and methods described herein may be embodied in a variety of other forms; furthermore, various omissions, substitutions and changes in the form of the devices and methods described herein may be made without departing from the spirit of the inventions. The accompanying claims and their equivalents are intended to cover such forms or modification as would fall within the scope and spirit of the inventions.

Certain aspects, advantages, and novel features of the embodiment have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

What is claimed is:

1. A method for manufacturing a laminated core, comprising:
    laminating a plurality of core pieces to obtain a laminate, the plurality of core pieces comprising an upper core piece forming an upper end surface of the laminate, a lower core piece forming a lower end surface of the laminate and at least two central core pieces located between the upper core piece and the lower core piece in a height direction of the laminate; and
    forming a weld bead on a side surface of the laminate by partially melting the plurality of core pieces, the weld bead extending continuously from the upper end surface of the laminate to the lower end surface of the laminate in the height direction of the laminate,
    wherein forming the weld bead includes:

forming a first end portion of the weld bead by partially melting the upper core piece, forming a center portion of the weld bead that extends in the height direction of the laminate by partially melting the at least two central core pieces to each other and forming a second end portion of the weld bead by partially melting the lower core piece;

wherein a maximum cross-sectional area of the center portion of the weld bead in a direction orthogonal to the height direction of the laminate is larger than a cross-sectional area of the first end portion and the second end portion of the weld bead in the orthogonal direction.

2. The method according to claim 1, wherein forming the weld bead includes setting a welding current value for the center portion of the weld bead to be greater than a welding current value for first and the second end portions of the weld bead in order to vary a cross-section area of the weld bead.

3. The method according to claim 2, wherein forming the weld bead includes setting a welding speed for the center portion of the weld bead to be slower than a welding speed for the first and the second end portions of the weld bead in order to vary a cross-sectional area of the weld bead.

4. The method according to claim 1, wherein forming the weld bead includes setting a welding speed for the center portion of the weld bead to be slower than a welding speed for the first and the second end portions of the weld bead in order to vary a cross-sectional area of the weld bead.

5. The method according to claim 1, wherein forming the weld bead includes welding the center portion of the weld bead multiple times in order to vary a cross-sectional area of the weld bead.

6. The method according to claim 1, wherein forming the weld bead includes forming the weld bead such that the maximum cross-sectional area associated with the center portion of the weld bead continuously decreases in the height direction to the cross-sectional area associated with the first and the second end portions of the weld bead.

7. The method according to claim 6, wherein a minimum cross-sectional area associated with the first and the second end portions extends across two or more of the plurality of core pieces in the height direction of the laminate.

8. The method according to claim 1, wherein forming the weld bead includes setting a welding heat value for the center portion of the weld bead to be greater than a welding heat value for the first and the second end portions of the weld bead in order to vary a cross-sectional area of the weld bead.

9. The method according to claim 1, wherein forming the weld bead includes forming the first end portion, the center portion, and the second end portion as a continuous weld bead formed by a single pass of a welding torch across the side surface of the laminate.

10. A method for manufacturing a laminated core, comprising, laminating a plurality of core pieces to obtain a laminate; and forming a weld bead on a side surface of the laminate by partially melting the plurality of core pieces, the weld bead extending from an upper end surface of the laminate to a lower end surface of the laminate in a height direction of the laminate, wherein forming the weld bead includes applying a greater amount of heat to a center portion of the weld bead as compared to an amount of heat applied to an end portion of the weld bead in a longitudinal direction of the weld bead, and welding a first section of the weld bead, and subsequently welding a second section of the weld bead which at least partially overlaps the first section at the center portion of the weld bead so that the center portion of the weld beam is welded multiple times.

11. The method according to claim 10, wherein a maximum cross-sectional area of the center portion of the weld bead in a direction orthogonal to the longitudinal direction of the weld bead is larger than a cross-sectional area of the end portion of the weld bead in the orthogonal direction.

12. A laminated core, comprising:

a plurality of core pieces laminated together as a laminate, the plurality of core pieces comprising a first end core piece forming a first end surface of the laminate, a second end core piece forming a second end surface of the laminate, and at least two central core pieces located between the first end core piece and the second end core piece in a height direction of the laminate; and a weld bead located on a side surface of the laminate, the weld bead extending continuously from the first end surface of the laminate to the second end surface of the laminate in the height direction of the laminate, wherein the weld bead includes:

a first end portion formed by partially melting the first end core piece, and a center portion that extends in the height direction of the laminate and is formed by partially melting the at least two central core pieces to each other, and wherein a maximum cross-sectional area of the center portion of the weld bead in a direction orthogonal to the height direction of the laminate is larger than a cross-sectional area of the first end portion of the weld bead in the orthogonal direction.

13. The laminated core according to claim 12, wherein the weld bead further includes a second end portion formed by partially melting the second end core piece, and wherein the maximum cross-sectional area of the center portion of the weld bead in the orthogonal direction is larger than a cross-sectional area of the second end portion of the weld bead in the orthogonal direction.

14. The laminated core according to claim 13, wherein the first end portion, the center portion, and the second end portion are formed in a longitudinal direction of the weld bead, and wherein the longitudinal direction is parallel to the height direction of the laminate.

15. The laminated core according to claim 13, wherein a minimum cross-sectional area associated with the first and the second end portions extends across two or more of the plurality of core pieces in the height direction of the laminate.

16. The laminated core according to claim 12, wherein the first end portion of the weld bead is formed by partially melting the first end core piece to an adjacent core piece, and wherein the adjacent core piece is located between the first end core piece and the at least two central core pieces.

17. A welding machine, comprising:

a welding torch;

an actuator configured to move the welding torch continuously from a first end surface of a laminate to a second end surface of the laminate in a height direction of the laminate along a side surface of the laminate, wherein the laminate includes a plurality of core pieces laminated together; and a controller configured to control the welding torch and the actuator so as to form the weld bead on the side surface of the laminate, wherein the controller configured to perform a plurality of operations including:

forming a first end portion of the weld bead by partially melting, with the welding torch, a first end core piece located at the first end surface of the laminate, forming a center portion of the weld bead that extends in the height direction of the laminate after forming the first end portion by partially melting, with the welding torch, at least two adjacent central core pieces to each other, the at least two central core pieces positioned at a center portion of the laminate in the height direction of the laminate, and forming a second end portion of the weld bead after forming the center portion by partially melting, with the welding torch, a second end core piece located at the second end surface of the laminate, wherein a maximum cross-sectional area of the center portion in a direction orthogonal to the height direction of the laminate is larger than a cross-sectional area of the first and the second end portion in the orthogonal direction.

18. The welding machine according to claim 17, wherein the controller is configured to form the weld bead by varying a welding current of the welding torch, wherein a first welding current value is used to form the center portion of the weld bead, and wherein a second welding current value is used to form one or both of the first and the second end portions of the weld bead.

19. The welding machine according to claim 17, wherein the controller is configured to form the weld bead by varying a welding speed of the welding torch, wherein a first welding speed value is used to form the center portion of the weld bead, and wherein a second welding speed value is used to form one or both of the first and the second end portions of the weld bead.

20. The welding machine according to claim 17, wherein the controller is configured to form the weld bead by forming the first end portion, the center portion, and the second end portion as a continuous weld bead formed by a single pass of the welding torch across the side surface of the laminate.

* * * * *